United States Patent

[11] 3,585,416

[72] Inventor Howard G. Mellen
60 Minton Ave., Chatham, N.J. 07928

[21] Appl. No. 864,368
[22] Filed Oct. 7, 1969
[45] Patented June 15, 1971

[54] PHOTOPIEZOELECTRIC TRANSDUCER
10 Claims, 10 Drawing Figs.

[52] U.S. Cl. .......... 310/8.1, 250/211, 310/8.2, 310/8.6, 310/9.7
[51] Int. Cl. .......... H01v 7/00
[50] Field of Search .......... 310/8.1, 8.2, 8.3, 8.5, 8.6, 9.1, 7.4, 9.7; 318/313; 250/211, 229, 232

[56] References Cited

UNITED STATES PATENTS

| | | | |
|---|---|---|---|
| 3,202,824 | 8/1965 | Yando | 250/211 |
| 2,722,614 | 11/1955 | Fryklund | 310/8.6 |
| 3,446,975 | 5/1969 | Adler et al. | 250/211 |
| 3,115,588 | 12/1963 | Hueter | 310/8.6 |
| 3,356,850 | 12/1967 | Fleming-Williams | 250/211 |
| 3,487,220 | 12/1969 | Buchy et al. | 250/211 |
| 2,403,692 | 7/1946 | Tibbetts | 310/8.5 |

*Primary Examiner*—D. F. Duggan
*Assistant Examiner*—B. A. Reynolds
*Attorney*—Rudolph J. Jurick

ABSTRACT: A piezoelectric bender transducer in combination with a photovoltaic cell in place of the electrodes.

INVENTOR.
HOWARD G. MELLEN
BY
Rudolph J. Jurick
ATTORNEY

INVENTOR.
HOWARD G. MELLEN
BY
Rudolph J. Jurick
ATTORNEY

INVENTOR.
HOWARD G. MELLEN
BY
Rudolph J. Jurick
ATTORNEY

INVENTOR.
HOWARD G. MELLEN
BY
Rudolph J. Jecrick
ATTORNEY

PHOTOPIEZOELECTRIC TRANSDUCER

The invention described herein may be manufactured for and used by the Government of the United States of America for Governmental purposes without the payment of any royalties thereon or therefore.

BACKGROUND OF THE INVENTION

Transducers employing piezoelectric materials are replacing electromechanical transducers for reasons such as their improved efficiency and reliability, lower cost and smaller size. The piezoelectric material is polarized in a given direction so that when it is polarized in a given direction so that when it is electrically stimulated, a stress is created therein to cause movement of the material in a mode corresponding to the vectorial directions of the stimulus relative to the polarization. Heretofore, the piezoelectric material has been stimulated by applying thereto a voltage from an external voltage source. In accordance with this invention, the requirement for an external voltage source is eliminated. The stimulating voltage is developed by a photovoltaic material applied directly to the surface of a strip of piezoelectric material.

SUMMARY OF THE INVENTION a photovoltaic cell is formed on the surface of a strip of piezoelectric material which has been polarized in a given direction. The photovoltaic cell generates a DC voltage which varies with the intensity of the light impinging thereon. By clamping one or both ends of the strip, the combination forms a transducer which converts light energy directly into mechanical motion.

An object of this invention is the provision of a transducer for converting light energy directly into mechanical energy in the form of motion.

An object of this invention is the provision of a photopiezoelectric transducer comprising a strip of piezoelectric material having formed thereon a photovoltaic cell.

An object of this invention is the provision of a transducer comprising a thin strip of piezoelectric material prepolarized in predetermined directions, means for supporting said strip, and a plurality of photovoltaic cells formed directly on the flat surface of said strip.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views.

DESCRIPTION OF PREFERRED EMBODIMENTS

Figures 1, 2, 3, 4:
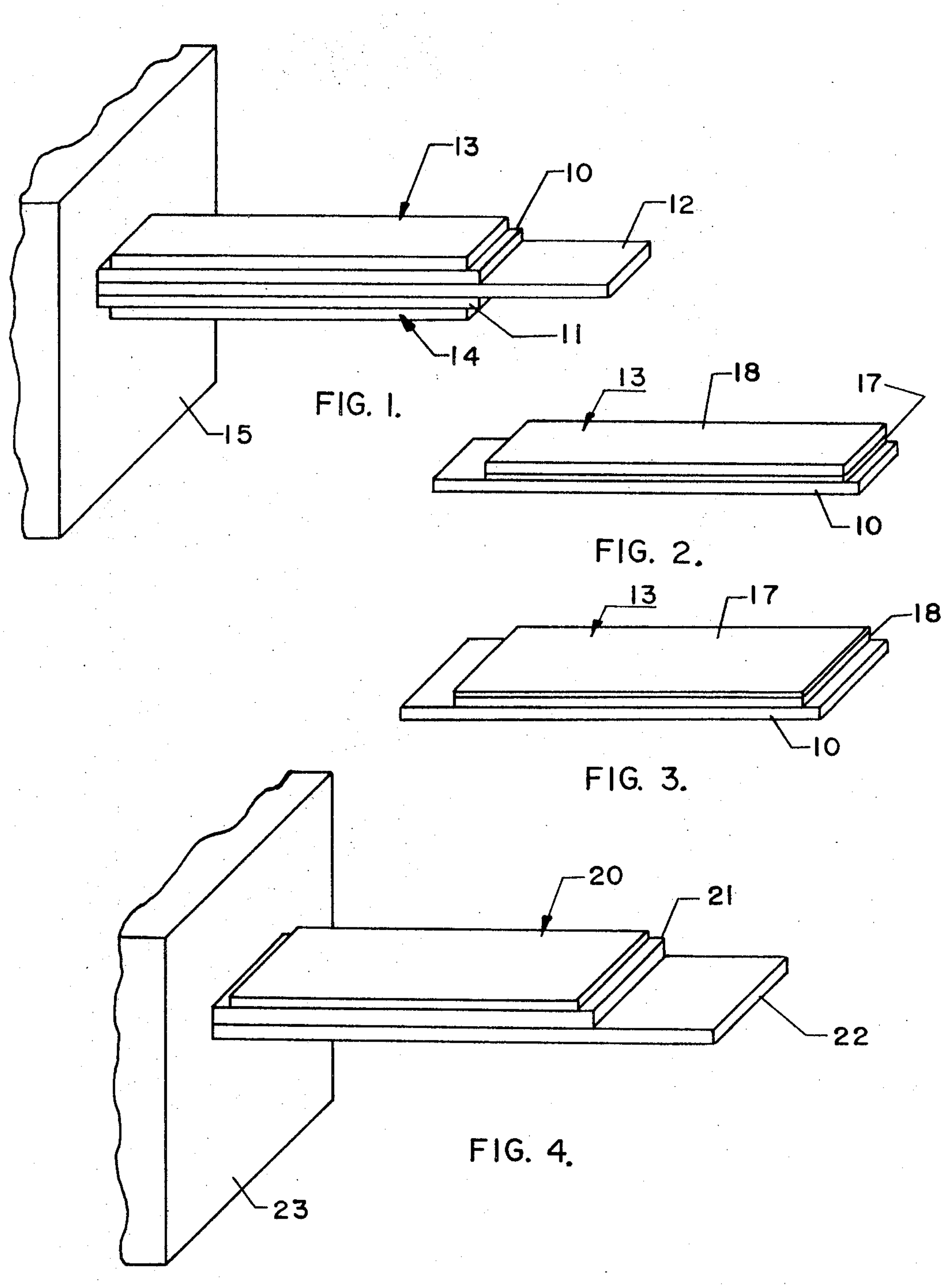
FIG. 1 is an isometric view of a cantilever-type transducer made in accordance with one embodiment of this invention.
FIGS. 2 and 3 are isometric views showing two methods of forming the photovoltaic cell on the piezoelectric material.
FIG. 4 is an isometric view showing a cantilever transducer made in accordance with another embodiment of this invention.

Reference now is made to FIG. 1 wherein there are shown two, thin strips 10 and 11 of piezoelectric ceramic material, which strips are bonded to a conductive metal strip 12 as by means of a conductive epoxy resin. Normally, a silver coating is applied to both of the flat surfaces of the ceramic strips 10 and 11 to provide the electrodes for the polarization of such strips. The polarization of the ceramic strips can be accomplished prior to or after the bonding thereof to the supporting strip 12. Photovoltaic cells 13 and 14 are then formed on the outer surfaces of the ceramic strips.

The photovoltaic cells may be formed of selenium, silicon or other material having the property of generating a voltage when exposed to light. Selenium-type photocells because of their melting point of about 217° C. are more compatible with lead zirconate titanate piezoelectrics some of which have Curie Temperatures in excess of 300° C. The selenium therefore can be deposited directly on the surface of the polarized piezoelectric since the selenium's working temperature does not exceed that temperature at which excessive depolarization would take place. The selenium photovoltaic cell has its greatest efficiency when a thin film of cadmium oxide or other semiconductive material is deposited on the selenium surface, the cadmium oxide film being thin enough to permit light to pass therethrough yet being thick enough to be conductive.

The electrical energy for stressing the piezoelectric material strips 10 and 11 is developed by the photovoltaic cells 13 and 14 which are constructed as integral parts of the transducer. In an open circuit, the ceramic strips, having a thickness of the order of 0.003 inch, perform as capacitors storing electrical energy when a voltage is applied thereto, and this energy causes the ceramic strips to exhibit the piezoelectric characteristics. In the bender transducer shown in FIG. 1, wherein one end of the conductive strip 12 is anchored to a support 15, the piezoelectric effect causes an elongation of one of the ceramic strips and a shortening of the other strip, thereby causing the transducer to bend.

Two approaches for forming the selenium photocell can be used, depending upon the polarity of the ceramic strips. With either approach, the silver coating nearest the photocell is removed, as by a chemical wash. Where the polarity of the ceramic material is such that the direction of electron flow is towards the supporting strip 12, a thin coating of cadmium oxide is first deposited upon the ceramic in place of the silver coating. This is shown in FIG. 2, wherein the cadmium oxide coating deposited on the ceramic strip 10 is identified by the numeral 17. The cadmium can be deposited by a process of sputtering or evaporation and then oxidized. The selenium layer 18 is then spread on the cadmium oxide providing a reverse type of photocell. Where the polarity of the ceramic is such that the electron flow is away from the supporting strip, the photocell is formed as shown in FIG. 3, that is, the selenium layer 18 is spread on the ceramic strip 10 after which the cadmium oxide layer 17 is formed thereon. In the latter arrangement, the silver electrodes may or may not be removed, depending upon which approach provides the desired efficiency.

FIG. 4 illustrates a transducer in the form of a cantilever beam, wherein a thin strip of piezoelectric ceramic 21 is bonded to the thin metal strip 22. The single strip of ceramic is polarized through it's thickness and the photocell 20 is formed thereon. The construction of the transducer in this manner provides a bending motion as the ceramic strip 21 expands and contracts. The metal supporting strip 22 restricts the expansion and contraction of the ceramic strip, causing the beam to bend in an upward or downward direction, depending on the polarity of the applied voltage. The cadmium oxide coating of the photocell may be formed on the inner or on the outer surface of the selenium as has been described hereinabove with reference to FIGS. 2 and 3, respectively.

Figure 5:
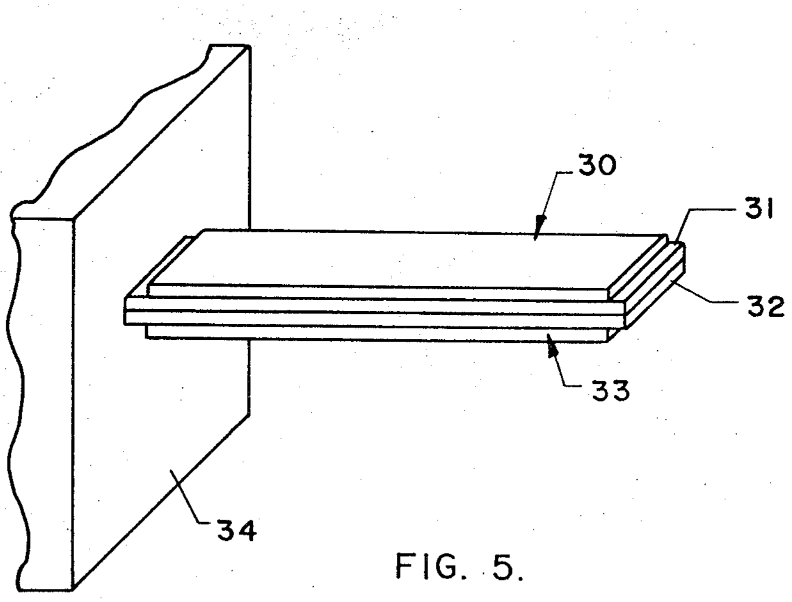
FIG. 5 is an isometric view of a cantilever transducer made in accordance with another embodiment of this invention.

Referring to FIG. 5 there is shown a transducer wherein the central, supporting metal strip is eliminated. The ceramic strips 31 and 32 are first polarized so that their direction of polarization are towards each other when they are cemented together. The photovoltaic cells 30 and 33 are formed on the ceramic strips and have cadmium oxide films formed either on the inner or outer surfaces thereof, depending upon the established polarity of the ceramic strips. End portions of the ceramic strips are clamped to a support 34.

Figure 6:
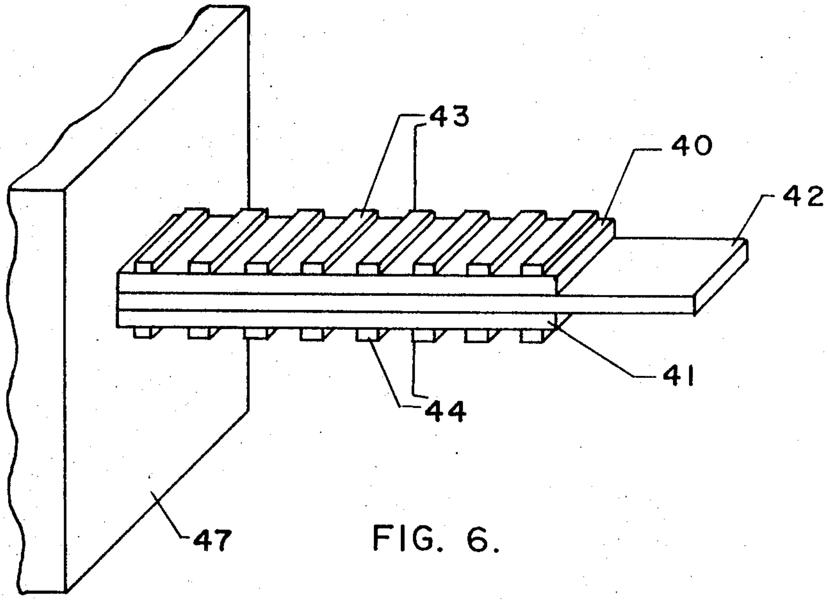
FIG. 6 is an isometric view showing a cantilever transducer made in accordance with still another embodiment of this invention.

The transducer shown in FIG. 6 is generally similar to that shown in FIG. 1 in that the ceramic strips 40 and 41 are bonded to a supporting metal strip 42. In this arrangement, however, the electrodes for prepolarizing the ceramic strips comprise a plurality of relatively narrow spaced, silver bands extending transversely across the strips. The ceramic strips are polarized through their thickness as well as between the transverse bands by means of an appropriate fixture provided with contact members for engagement with each of such bands. After the polarization of the ceramic strips, spaced, rectangular photovoltaic cells 43 are formed on the ceramic strip 40 over the silver bands. Similarly, spaced photovoltaic cells 44 are formed over the silver bands carried by the strip 41. When exposed to light, the voltage generated by the photovoltaic cells causes one ceramic strip to expand and the other strip to contract, in the length mode, thereby resulting in a bending of the transducer in one or the other direction. The formation of a plurality of photocells on a strip of the piezoelectric material can also be applied to the single strip transducer shown in FIG. 4. In either arrangement, the multiplicity of photocells provide increased transducer deflection under a given light intensity striking the photocell surface. It also is here pointed out that maximum expansion of the piezoelectric element occurs when it is polarized in the length mode. This is accomplished by applying the polarizing voltage to silver coatings formed on the ends of the ceramic strips, which coatings are removed, preferably before the formation of the photovoltaic cells.

Figure 7:
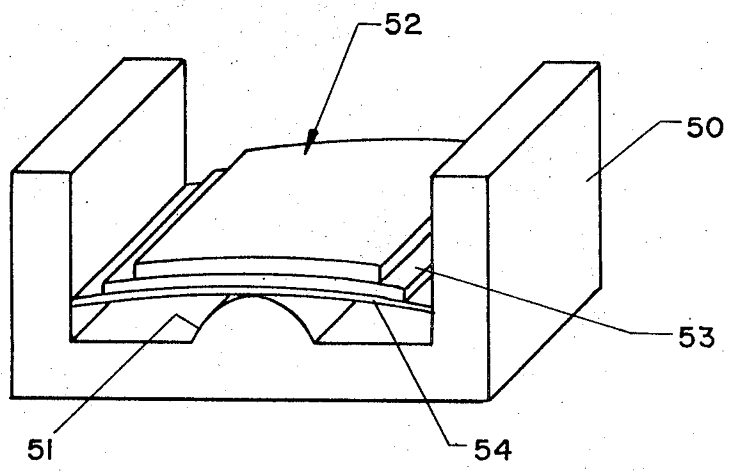
FIG. 7 is an isometric view showing a transducer wherein the piezoelectric element is confined between the arms of a mounting block.
Figure 8:
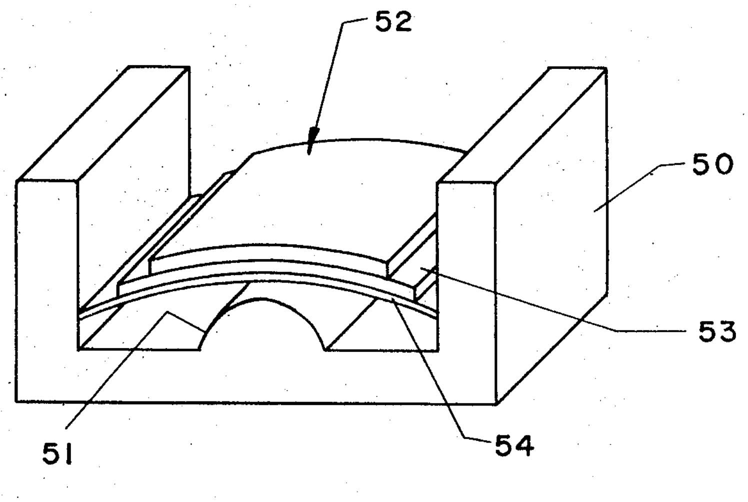
FIG. 8 is a similar view showing the piezoelectric element bent in response to light impinging upon the photovoltaic cell.

Reference now is made to FIG. 7, wherein there is shown a U-shaped mounting block 50 having a center rest 51 which provides a support for the active elements of the transducer and assures its direction of bend. In the illustrated arrangement, the photovoltaic cell 52 is formed on the ceramic strip 53 bonded to the metal supporting strip 54, the latter strip having end portions extending into slots formed in the arms of the mounting block. It will be apparent, however, that the supporting strip may be omitted, as shown in the transducer construction of FIG. 5. When such metal supporting strip is omitted, the block 50 provides all the opposing force necessary for the transducer to bend. Desirably, the height of the center rest 51 is such as to establish an initial bend in the piezoelectric element to reduce the energy loss resulting from the compression of the element as it expands in the direction of the block arms. Where the element is supported on a thin metal strip, the energy loss at the line of contact with the block, is further reduced. This further reduction in energy loss through compression is caused by the metal strip which resists the expansion of the piezoelectric material, causing it to bend rather than exert increased force against its' confined ends. Upon light energy striking the photovoltaic cell the transducer bend above the center rest, as shown in FIG. 8.

Figure 9:
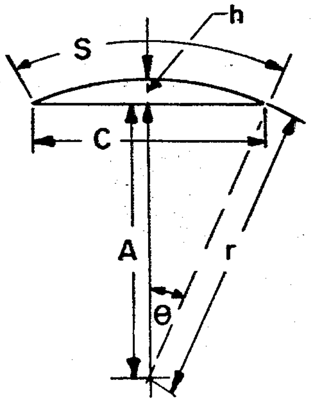
FIG. 9 is a geometric representation for determining the approximate distance the transducer will bend due to a given change in length thereof.

Mathematically, not allowing for losses due to compression of the piezoelectric element by the holding block at the ends of the transducer, the central portion of the piezoelectric element will bend above the center rest 51 a distance of the order of 10 times its expansion in length. With reference to FIG. 9, the approximate deflection, $h$, of the transducer above the center rest, for a given change in length, can be determined from the equations, $$S=r(2\theta) \quad (1)$$

and $$h=r-\sqrt{r^2-(c/2)^2} \quad (2)$$

wherein:

$S$ = the length of the arc formed by the expanded transducer element, $r$ = radius of the arc, $\theta$ = one-half the angle formed by the arc $S$, and $c$ = the cord of the arc.

Equation (1) is derived from the fact that the central angle is proportional to the arc formed by intersecting radii and equation (2) is derived from the fact that the square of the hypotenuse of a right triangle is equal to the sum of the squares of its sides.

Figure 10:
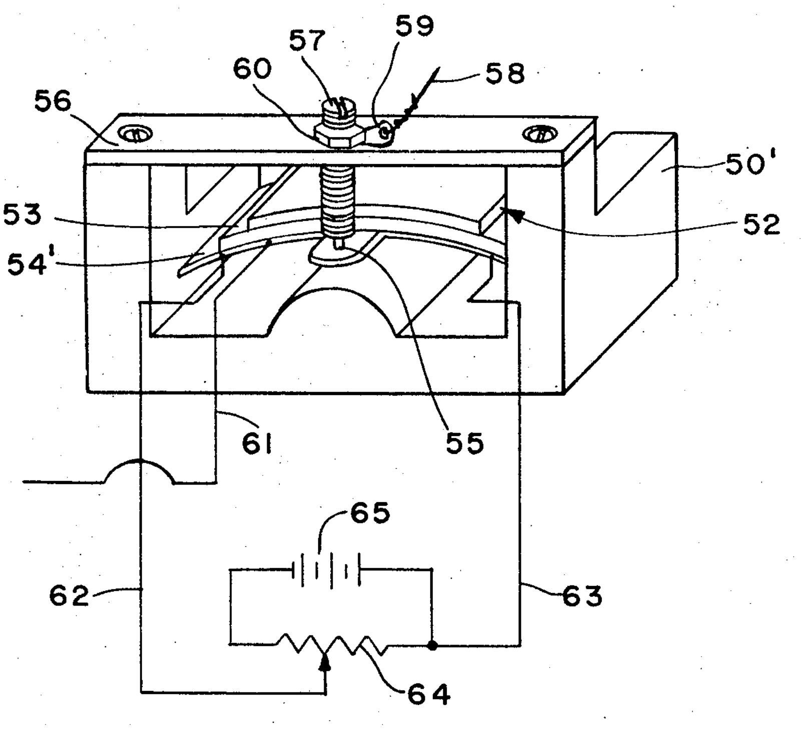
FIG. 10 is a similar to FIG. 7 and showing an arrangement for adjusting the sensitivity of the transducer.

FIG. 10 shows a photopiezoelectric transducer designed to meet requirements where refined adjustment in sensitivity is required. The ceramic strip 53 is polarized in the length direction and has the photovoltaic cell 52 formed thereon. Secured to the upstanding arms of the mounting block 50' is a crossarm 56, said block and arm being made of insulating material. The crossarm carries a screw 57 having a tip 55 made of a good, electrical contact material. A lead wire 58 has an end soldered to a terminal 59 which is secured in place by a nut 60. Another lead wire 61 is soldered to the supporting metal plate 54' which plate has an integral extension underlying the contact tip 55. When light strikes the photovoltaic cell 52, the transducer bends, thereby closing an electrical circuit connected to the lead wires 58 and 61. A second pair of flexible lead wires 62 and 63 are connected to the ends of the metal strip 54', these wires being connected to the output terminals of a potentiometer 64 which is connected to a voltage source 65. The voltage across the wires 62 and 63 may be adjusted to increase or decrease the displacement of transducer, depending upon the polarity of such voltage relative to the polarization of the ceramic strip 53.

Although the embodiments of the invention have been described with specific reference to transducers utilizing polarized ceramic elements, the same results can be obtained by utilizing electroresistive elements. In such cases, the ceramic elements are not prepolarized but have the characteristic of expanding and contracting with changes in a voltage applied thereto. The described transducers make possible the reduction of components for many photo switch requirements, together with a saving of space and cost. For example, in munitions fuzing, the transducers provide a direct and compact means to activate a mine in the daytime and automatically deactivate it at night, or visa versa.

Having now described the invention what I desire to protect by Letters Patent is set forth in the following claims.

I claim:

1. A piezoelectric bender transducer of the class where a stimulating voltage is applied to electrodes formed on a strip of piezoelectric material, said transducer being characterized in that the stimulating voltage is developed by a photovoltaic cell formed on the surface of said strip.

2. A piezoelectric bender transducer comprising, a. a thin strip of polarized piezoelectric material, b. means supporting said strip in a predetermined orientation while affording bending movement thereof, and c. photovoltaic means formed on a surface of the said strip, the bending movement of the transducer being in correspondence with the voltage developed by the photovoltaic means.

3. The invention as recited in claim 2, wherein the strip of piezoelectric material is polarized in the direction of its length.

4. The invention as recited in claim 2, wherein the said photovoltaic means comprises a plurality of individual, spaced photovoltaic cells.

5. The invention as recited in claim 2, including a second thin strip of polarized piezoelectric material, the two strips of piezoelectric material being bonded together, and second photovoltaic means formed on a surface of said second strip of piezoelectric material.

6. The invention as recited in claim 5, wherein the two strips of piezoelectric material are polarized in a direction normal to their length.

7. The invention as recited in claim 2, wherein the means supporting the strip of piezoelectric material is a thin metal strip having the strip of piezoelectric material bonded to a surface thereof, said metal strip having one end portion secured to a support member.

8. The invention as recited in claim 7, including a second thin strip of piezoelectric material bonded to the other surface of the metal strip, and photovoltaic means formed on the surface of said second strip of piezoelectric material.

9. The invention as recited in claim 7, wherein the said support member is a mounting block having spaced arms, said one end portion of the metal strip being secured to one of said arms, and the other end portion of the metal strip being secured to the other of said arms.

10. The invention as recited in claim 9, wherein said mounting block is made of an insulating material, and including means for applying an external voltage across the ends of said metal strip.